United States Patent
Yeh et al.

(10) Patent No.: US 8,724,208 B2
(45) Date of Patent: May 13, 2014

(54) COLOR DISPLAY AND METHOD FOR MANUFACTURING COLOR DISPLAY

(75) Inventors: Chia-Chun Yeh, Hsinchu (TW); Yao-Chou Tsai, Hsinchu (TW); Henry Wang, Hsinchu (TW); Ted-Hong Shinn, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 33 days.

(21) Appl. No.: 13/335,400

(22) Filed: Dec. 22, 2011

(65) Prior Publication Data
US 2012/0250135 A1    Oct. 4, 2012

(30) Foreign Application Priority Data
Mar. 29, 2011   (TW) .............................. 100110801 A

(51) Int. Cl.
*G02F 1/15*    (2006.01)
(52) U.S. Cl.
USPC ......................................................... 359/265
(58) Field of Classification Search
USPC ................. 359/265–275, 296, 228, 253, 900; 345/105, 107; 438/30, 70, 662; 445/25
See application file for complete search history.

(56) References Cited

U.S. PATENT DOCUMENTS

| 7,572,718 B2 * | 8/2009 | Kanno et al. ................... 438/585 |
| 7,649,669 B2 * | 1/2010 | Abe ............................... 359/273 |
| 7,920,317 B2 * | 4/2011 | Lee et al. ....................... 359/253 |
| 8,088,475 B2 * | 1/2012 | Sasaki et al. ............... 428/304.4 |

FOREIGN PATENT DOCUMENTS

TW    200739228 A    10/2007

OTHER PUBLICATIONS

TW Office Action, p. 1, Publication Date Oct. 16, 2007.

* cited by examiner

*Primary Examiner* — Tuyen Tra
(74) *Attorney, Agent, or Firm* — CKC & Partners Co., Ltd.

(57) ABSTRACT

A method for manufacturing a color display provides a bottom substrate, injects a liquid display media onto the bottom substrate, and disposes a sealing substrate on the liquid display media, such that the liquid display media is contained between the sealing substrate and the bottom substrate. The method also aligns an image device corresponding to the bottom substrate and transfers a color coating onto the sealing substrate by a laser device through a laser thermal transfer process to form a color filter layer on the sealing substrate.

6 Claims, 4 Drawing Sheets

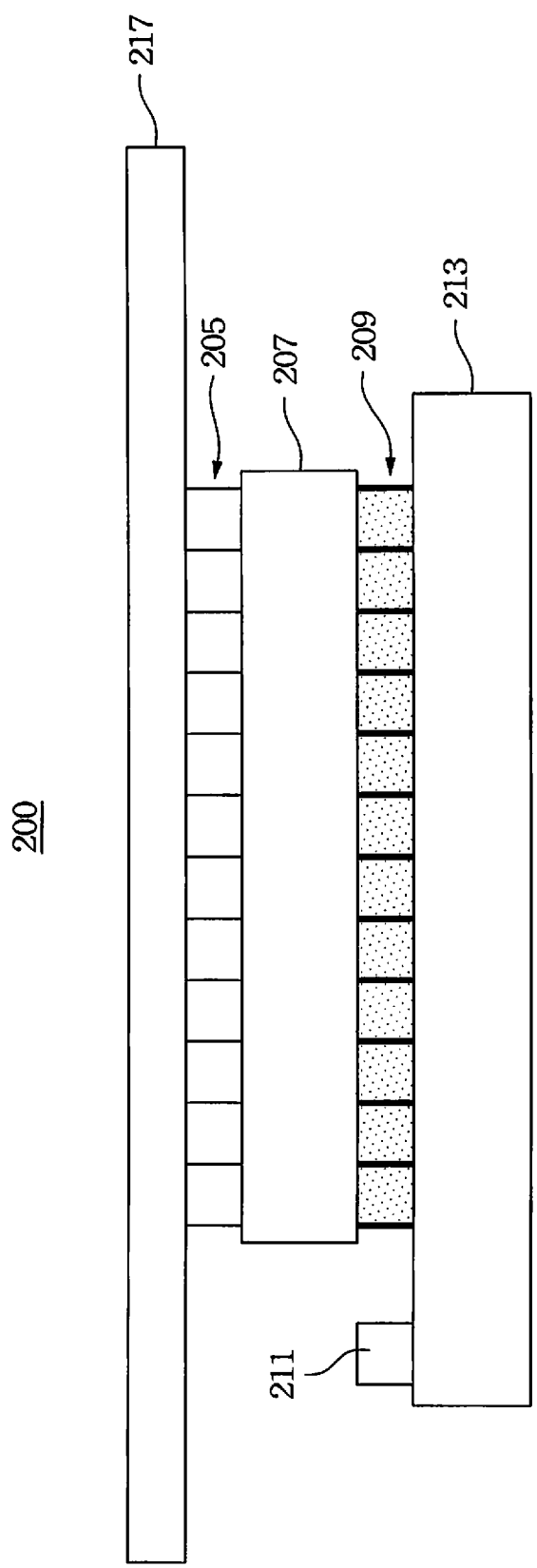

COLOR DISPLAY AND METHOD FOR MANUFACTURING COLOR DISPLAY

RELATED APPLICATIONS

This application claims priority to Taiwan Application Serial Number 100110801, filed Mar. 29, 2011, which is herein incorporated by reference.

BACKGROUND

1. Field of Invention

The present invention relates to a color display. More particularly, the present invention relates to a color display adopting the liquid display media.

2. Description of Related Art

The Liquid display medium substantially includes the electrochromic display media and the electrowetting displays media. The electrochromic material, having a greater tunable wavelength range and greater optical density differences, can block out most of the heat and the visible light. To change the color, the electric field is employed to inject the ions into the electrochromic material for inspiring the electron migration, and the absorption spectra or the emission spectra of the electrochromic material is changed during the electron migration process. Furthermore, the magnitude of the electric field can be adjusted to obtain a variety of colors, and the light penetration ability is varied as a result. The color changing process is reversible, and the electrochromic material will restore the original color if there is no external electric field. Therefore, the properties of electrochromic materials can be employed to produce the electrochromic display device.

On another aspect, the electrowetting display is a display of another type that uses the electrowetting phenomenon or the electrocapillary phenomenon. When the electric field influences the fluid and changes the free surface energy of the fluid, the distribution area of the fluid varies accordingly. The electrowetting-style display usually has the opaque non-polar liquid that includes the black dye disposed within the pixel area. When the operation voltage is turned off, the opaque non-polar liquids is evenly distributed among the pixels to block the light, and the pixels is in the dark state; when the operation voltage is turned on, the voltage source generates the electric field which produces the electrical wetting force to condense the opaque non-polar liquids. As a result, most of the pixel regions are exposed, and the pixels is in the bright state.

However, the electrochromic display media, the electrowetting display media, or the liquid display medium of other types is not easy for packaging because of the flow characteristics. If the color filter is taken as the packaging material, it is more difficult to accurately position the color filter even if the package environment is proper. However, if the color filter is not properly positioned, the re-packaging is required to re-arrange the color filter, which might cause the loss of the sealed liquid display media.

SUMMARY

According to one embodiment of the present invention, a method for manufacturing a color display is disclosed. The method provides a bottom substrate, injects a liquid display media onto the bottom substrate, and disposes a sealing substrate on the liquid display media, such that the liquid display media is contained between the sealing substrate and the bottom substrate. The method also aligns an image device with the bottom substrate and transfers a color coating onto the sealing substrate by a laser device through a laser thermal transfer process to form a color filter layer on the sealing substrate.

According to another embodiment of the present invention, a color display for displaying colorful images is disclosed. The color display includes a bottom substrate, a liquid display media, a sealing substrate, and a color filter layer. The bottom substrate has at least one alignment marker, in which an image device is aligned with the bottom substrate by the at least one alignment marker. The liquid display media is disposed on the bottom substrate for displaying the colorful images. The sealing substrate is disposed on the liquid display media for sealing the liquid display media on the bottom substrate. The color filter layer is disposed on the sealing substrate, wherein the color filter layer is formed by a laser thermal transfer process.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

FIG. 2C shows the cross sectional structure of the color display after the laser thermal transferring process according to another embodiment of the present invention.

DESCRIPTION OF THE PREFERRED EMBODIMENTS

Figure 1:
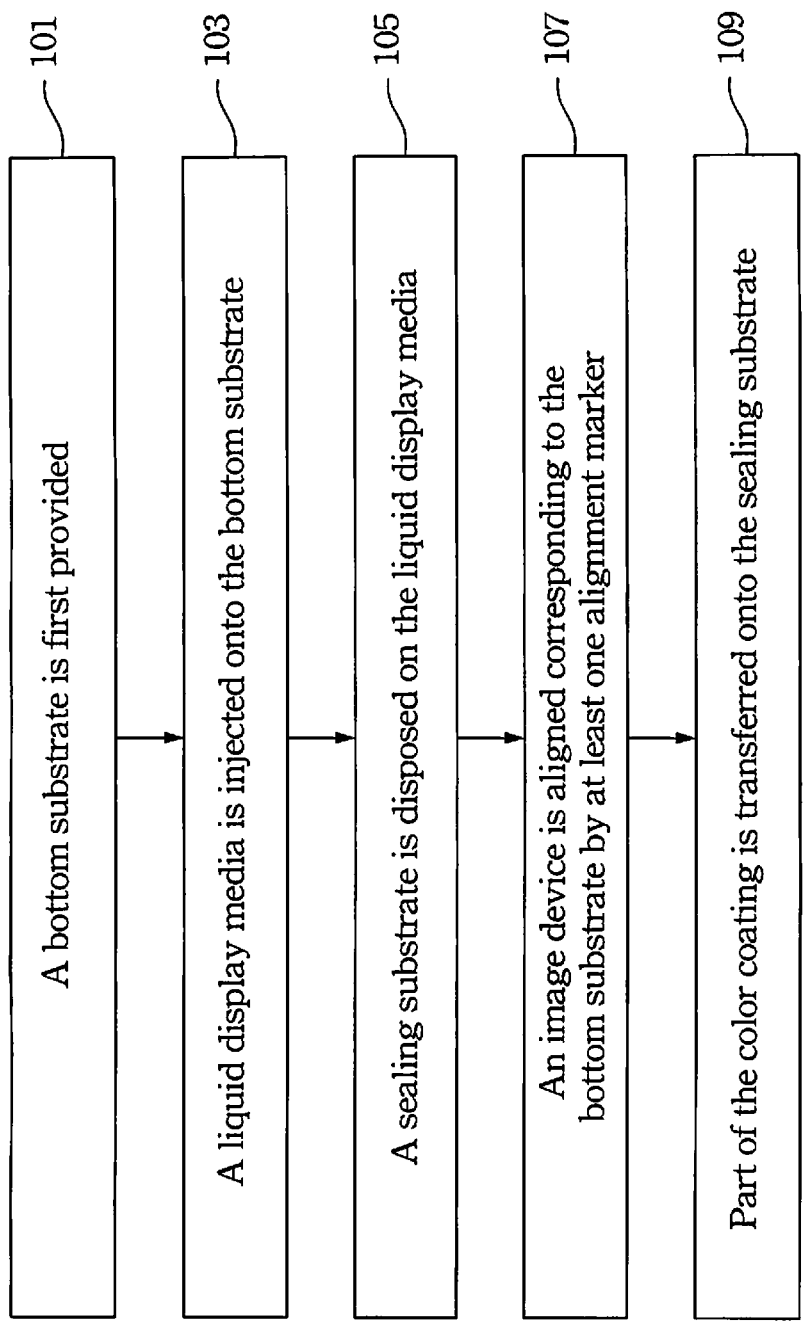
FIG. 1 shows the flowchart of the method for manufacturing a color display according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Instead of packaging the liquid display media and other structure with the color filter directly, the color display and its manufacturing method of the following embodiment packages the liquid display with a transparent substrate (such as the sealing substrate). After the packaging, the color filter is formed on the transparent sealing substrate through the laser thermal transferring way, and the precise alignment during the color filter manufacture is no longer required.

FIG. 1 shows the flowchart of the method for manufacturing a color display according to one embodiment of the present invention. As presented in the method shown in FIG. 1, a bottom substrate is first provided (step 101) and liquid display media is injected onto the bottom substrate (step 103). In step 103, a grid structure layer having plenty of grid structures are formed between the sealing substrate and the bottom substrate, in which the grid structures define a lot of display pixels. For example, each of the grid structures has only one pixel circuit disposed therein. The liquid display media, such as the electrowetting display media or the electrochromic display media, can be contained in the grid structures. Next, a sealing substrate is disposed on the liquid display media, such that the liquid display media is contained between the sealing substrate and the bottom substrate (Step 105). In other words, the embodiment of the present invention adopts the substrate (such as the transparent substrate) instead of the color filter to perform the packaging, and the precise alignment required by packaging with the color filter is no longer required; therefore, the package can be realized quickly.

After step 105, an image device is aligned corresponding to the bottom substrate by at least one alignment marker (step 107). In detail, the method of the embodiment can make the image device aim the alignment marker set on the bottom substrate; the method can also make the image device aim a particular display pixel on the bottom substrate after that pixel is turned on.

After aligning, part of the color coating is transferred onto the sealing substrate by a laser device through a laser thermal transfer process (step 109) to form the color filter layer having the red, the green, and the blue color filters on the sealing substrate. The color coating usually includes a thermal sensing layer and a pigment layer, and the thermal sensing layer transfers the pigment layer onto the sealing substrate to form the color filter layer when the laser beam from the laser device hits the color coating.

The laser thermal transfer process is that: when the laser beam hits the light sensing material of the color coating, the sensing material is converted to the thermal energy which is delivered to the thermal sensing/thermal desorption layer of the color coating. Then the thermal sensing/thermal desorption layer with the thermal energy departs the pigment layer and attaches the pigment layer to the target material. By changing the color of the color coating and the attached position, the colorful patterns with various colors can be generated on the target material.

In this embodiment, the liquid display media and the bottom substrate are packaged with the sealing substrate first, then the color filter is formed on the surface of the display panel after packaging. Therefore, the color filter is not used as the package material any more, and precise aligning for the bottom substrate/seal substrate is no longer required, which improves the yield and efficiency of the package process.

Figure 2A:
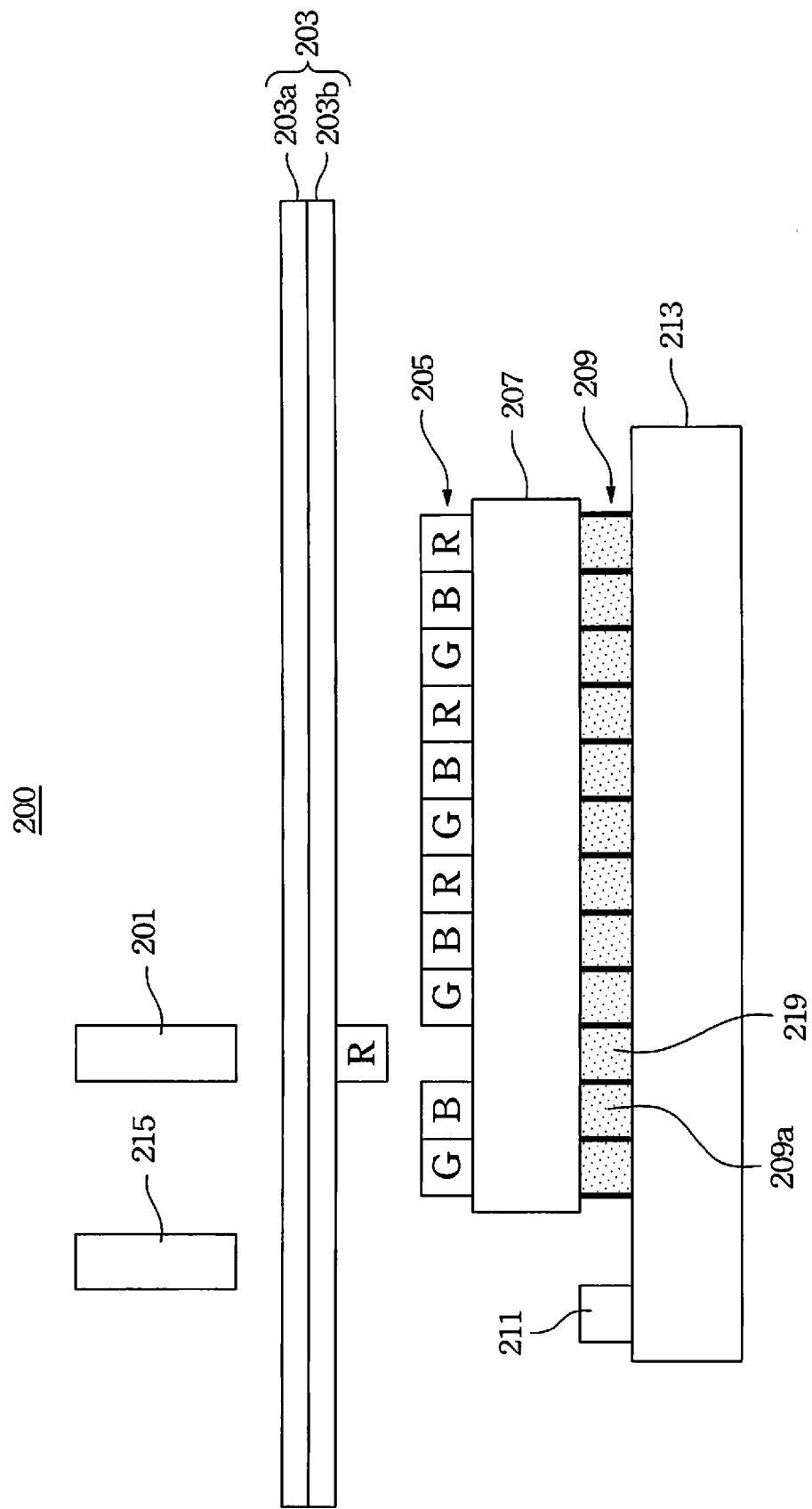
FIG. 2A shows the cross sectional structure of the color display during the manufacturing process according to one embodiment of the present invention.

FIG. 2A shows the cross sectional structure of the color display during the manufacturing process according to one embodiment of the present invention. The color display displaying the colorful images includes a bottom substrate 213, the liquid display media 219, a sealing substrate 207, and a color filter layer 205. The bottom substrate 213 has a grid structure layer 209 having a plurality of grid structures 209a and the alignment marker 211, in which an image device 215 is aligned with the bottom substrate 213 by the alignment marker 211. For example, the image device 215 can aim the alignment marker 211 and move to somewhere else first, then the laser device 201 emits the laser beam onto the positions of the color coating 203 to form the color filter.

The liquid display media 219, such as the electrowetting display media or the electrochromic display media, is disposed on the bottom substrate 213 and filled in each grid structures 209a, in which the liquid display media 219 displays the colorful images. To improve the optical contrast, the black shielding material or the black absorb material can formed as the barrier grid structure of the display media, and the light leakage occurring in the non-active region can be reduced. In the embodiment, the sealing substrate 207 seals the liquid display media 219 on the bottom substrate 213 and the sealing substrate 207 is a transparent glass substrate or a transparent plastic substrate.

The color coating 203 usually includes the thermal sensing layer 203a and the pigment layer 203b. When the laser beam from the laser device 201 hits the color coating 203, the thermal sensing layer 203a transfers the pigment layer 203a onto the sealing substrate 207 to form the color filter layer 205 disposed on the sealing substrate 207. In other words, the color filter layer 205 is generated by transferring the color coating 203 onto the sealing substrate 207 through the laser thermal transfer process. The color filter layer 205 substantially contains the red, the green, and the blue color filters which are produced by illuminating the color coating 203 of various colors (the red, the green, and the blue color coating).

Figure 2B:
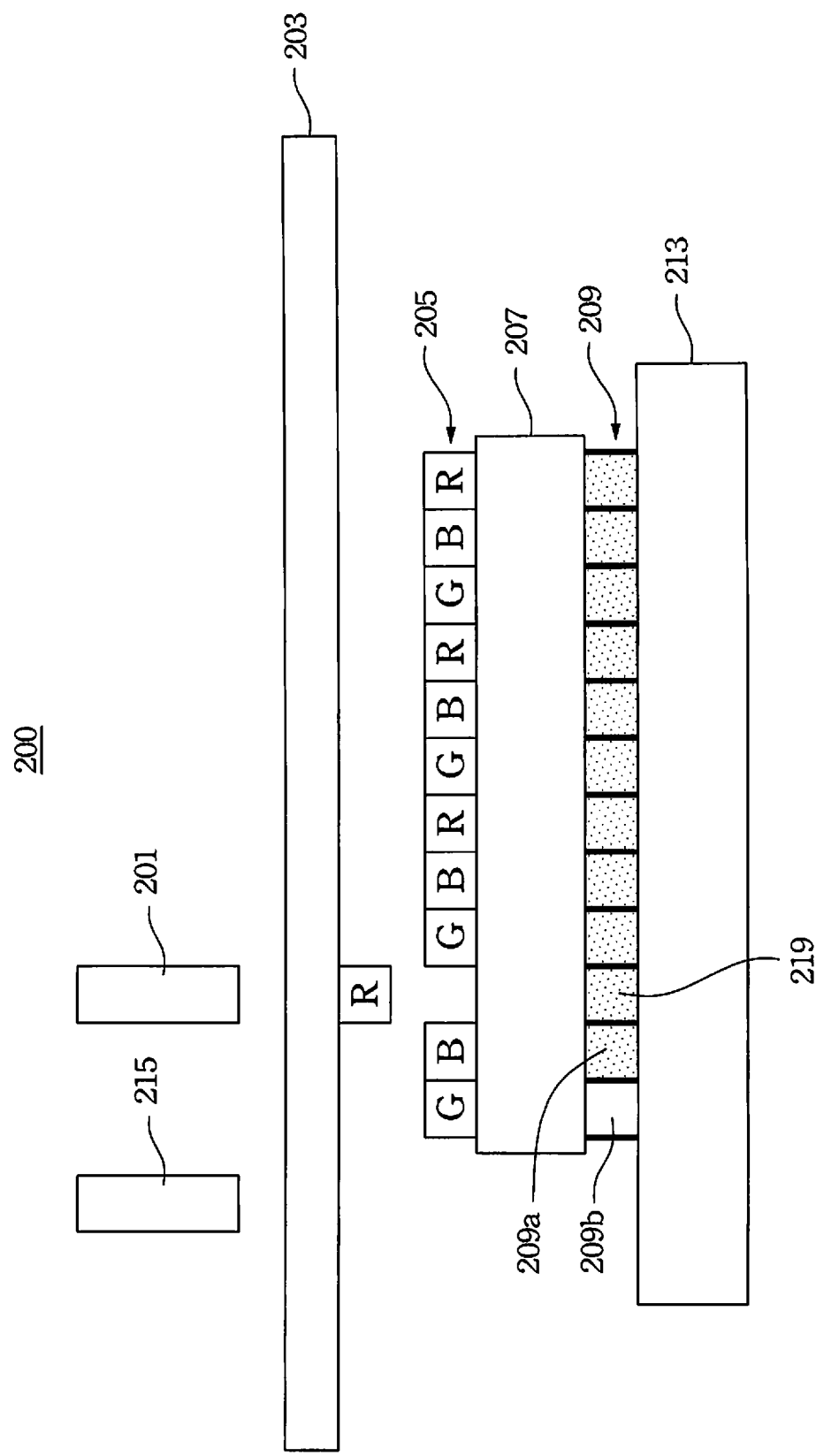
FIG. 2B shows the cross sectional structure of the color display during the manufacturing process according to another embodiment of the present invention.

FIG. 2B shows the cross sectional structure of the color display during the manufacturing process according to another embodiment of the present invention. The color display 200 in this embodiment, including the bottom substrate 213, the liquid display media 219, the sealing substrate 207, and the color filter layer 205, is similar to the color display 200 shown in FIG. 2A; however, the color display 200 in this embodiment uses the display pixel instead of the alignment marker for alignment; that is, the display pixel is first turned on then aligned. For example, the particular display pixel circuit 209b can be first driven then aimed by the image device 215; then the laser device 201 is moving around to emit the laser beam onto several positions of the color coating 203. The color coating 203 is thus transferred to the sealing substrate 207, and the color filter is thus produced.

FIG. 2C shows the cross sectional structure of the color display after the laser thermal transferring process has been done according to another embodiment of the present invention. In addition to the bottom substrate 213, the liquid display media 219, the sealing substrate 207, and the color filter layer 205, the color display 200 of this embodiment further includes a polymer film 217 disposed on one side of the color filter layer 205. The polymer film 217 which covers and protects the color filter 205 as well as the structures under there can be a anti-glare coating film, an anti-reflection film, a UV blocking film, a water blocking film, or a scratch resistant film.

The color display and the method for manufacturing the color display of the above embodiments packages/seals the liquid display media and other structures with a transparent sealing substrate instead of the color filter, therefore, precise alignment during the packaging is no longer required, and the package process can be completed faster. After the packaging, the color filter is formed on the transparent sealing substrate through the laser thermal transfer way, which eliminates the difficulty for precise alignment during the manufacture of the color filter.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for manufacturing a color display, comprising:
   providing a bottom substrate having at least one alignment marker;
   injecting a liquid display media onto the bottom substrate;
   disposing a sealing substrate on the liquid display media, such that the liquid display media is contained between the sealing substrate and the bottom substrate;
   aligning an image device with the bottom substrate; and transferring a color coating onto the sealing substrate by a laser device through a laser thermal transfer process to form a color filter layer on the sealing substrate.

2. The method for manufacturing the color display as claimed in claim 1, further comprising forming a grid structure layer having a plurality of grid structures formed between the sealing substrate and the bottom substrate.

3. The method for manufacturing the color display as claimed in claim 2, wherein the grid structures define a plurality of display pixels.

4. The method for manufacturing the color display as claimed in claim 3, wherein the image device is aligned with the bottom substrate by the display pixels after the display pixels are driven.

5. The method for manufacturing the color display as claimed in claim 1, wherein the color coating comprises a thermal sensing layer and a pigment layer, and the thermal sensing layer transfers the pigment layer onto the sealing substrate to form the color filter layer when a laser beam from the laser device hits the color coating.

6. The method for manufacturing the color display as claimed in claim 1, wherein the image device is aligned with the bottom substrate by the at least one alignment marker.

* * * * *